Feb. 20, 1945.　　R. W. JOHNSON ET AL　　2,369,740
STRAINER
Filed Aug. 6, 1943
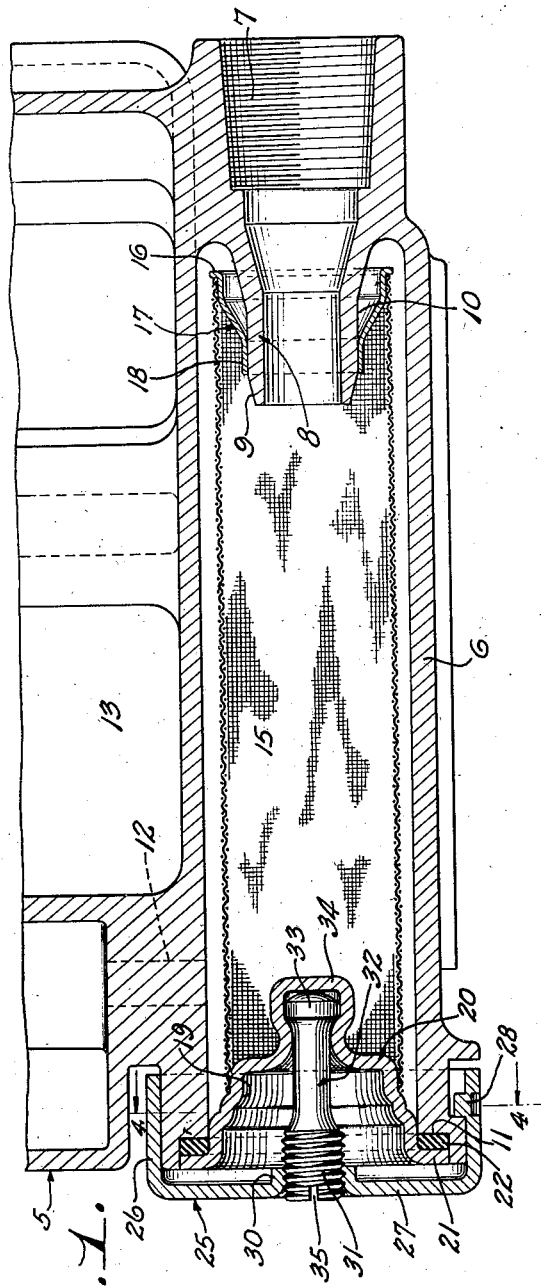
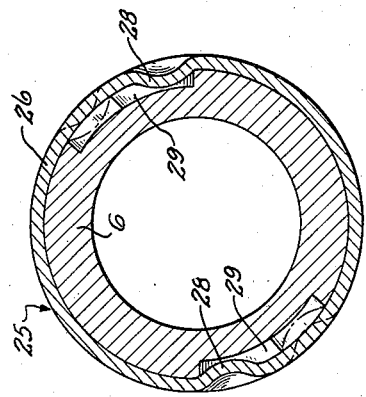
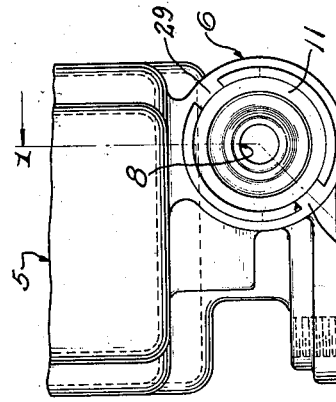
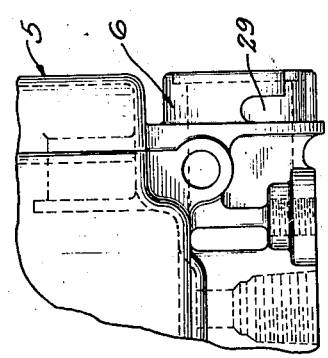
INVENTOR.
ROY W. JOHNSON
LOURDES V. McCARTY
BY
John W. Michael
ATTORNEY.

Patented Feb. 20, 1945

2,369,740

UNITED STATES PATENT OFFICE 2,369,740

STRAINER

Roy W. Johnson and Lourdes V. McCarty, Milwaukee, Wis., assignor to Automatic Products Company, Milwaukee, Wis., a corporation of Wisconsin Application August 6, 1943, Serial No. 497,604

7 Claims. (Cl. 210—164)

This invention relates to a strainer especially designed and adapted for use with so-called constant level devices widely employed with oil burners of the type wherein the fuel is fed by gravity from a reservoir or tank to the burner, the constant level device serving to maintain a constant hydrostatic head of oil to maintain a flame at a constant height.

Strainers employed with such devices are usually incorporated in the inlet conduit built into the device, the conduit being connected at one end to the pipe which leads thereto from the oil reservoir or supply tank and communicating at its opposite end with a valved passage leading to the main liquid supply chamber of the constant level device. Such strainers must be periodically removed, cleaned, and replaced by the users.

An object of the present invention is to provide a strainer construction of this character which is readily applicable to and removable from a constant level device as a unit, and this in such a way that it is not liable to be injured during the process of removal or application by even the most inexperienced persons. The construction is further such that when it is assembled with its inlet conduit, leak-proof connections are established between the strainer and the elements of the inlet conduit with which it is associated and also between the closure means associated with the strainer and the casing of the constant level device.

Another object of the invention is to provide a strainer having these advantages and capacities, and which is simple, compact, and closely organized in its construction, quickly attachable and detachable, and yet securely held in proper position when assembled. The elements of the strainer proper, with the exception of its closure cap and gasket, are permanently interconnected so that parts may not be dropped and lost and yet they are so effectively combined that when the cap is put into place, a proper leak-proof seal is insured between the interfitting parts of the strainer and inlet conduit.

Other objects and advantages reside in certain novel features of the construction, arrangement, and combination of parts, which will be hereinafter more fully described and particularly pointed out in the appended claims, reference being had to the accompanying drawing forming a part of this specification and in which:

Figure 1 is a fragmentary view partly in central, longitudinal, vertical cross section, taken on line 1—1 of Figure 3, and partly in side elevation, showing a strainer embodying the present invention and operatively associated with the inlet conduit of a constant level device;

Figure 2 is a fragmentary view in side elevation showing the exterior of one portion of a constant level device to illustrate the slot of the bayonet joint provided in the device to facilitate ready application and removal of a strainer assembly embodying the present invention;

Figure 3 is a fragmentary view in end elevation of the structure shown in Figure 2; and Figure 4 is a view in transverse, vertical, cross section taken on line 4—4 of Figure 1.

Referring to the drawing, the numeral 5 designates generally a constant level device of the type with which a strainer construction embodying the present invention may be advantageously utilized. The constant level device itself per se forms no part of the present invention and will not be described in detail. For a full disclosure of such device reference is made to United States Letters Patent No. 2,068,138, granted January 19, 1937, to Roy W. Johnson, for "Device for controlling the supply of fuel to oil burners and the like," and United States Letters Patent No. 2,120,364, granted June 14, 1938, to Roy W. Johnson, for "Device for controlling the supply of fuel to oil burners and the like."

For the purposes of the present invention it is sufficient to understand that such a constant level device has its main casing formed with an inlet conduit 6. One end of this inlet conduit 6 is internally threaded as at 7 to adapt it to be connected to a pipe line (not shown) which leads from the tank or reservoir or other source of supply of the liquid fuel (also not shown). Integrally formed with this inlet 7 of the conduit 6 is an inlet nipple 8 which projects into the conduit 6 and which has its inner end beveled as at 9. Adjacent the bevel 9 the outer periphery of the nipple 8 is cylindrical, as indicated at 10. The opposite end of the conduit 6 from the inlet 7 is open and is formed with a gasket seat 11. The conduit 6 communicates through a passage 12 with the inlet valve (not shown) which controls the flow of fuel to the main supply chamber 13 of the constant level device.

The strainer which embodies the present invention comprises a reticulated or wire mesh strainer tube 15. One end of this tube 15 is fitted over the flanged end 16 of a mounting collar designated generally at 17 and is soldered thereto. The collar 17 projects into its end of the strainer 15 and is inwardly tapered, as shown in Figure 1 of the drawing, and is provided with a coupling section 18 designed to have a leak-proof fit with the cylindrical portion 10 of the inlet nipple 8. The opposite end of the strainer tube 15 is fitted over a shouldered portion 19 of a closure member, designated as a whole at 20. The end portion of the strainer tube, engaged with the shouldered part 19 of the closure 20, is soldered thereto. The closure 20 is of stepped cup formation, as shown in the drawing, and has an outwardly directed, annular, gasket-engaging flange 21 at its large end. A gasket 22 is interposed and compressed between the flange 21 and gasket seat 11 when the parts are assembled to effect a seal between the closure member 20 and the opening at one end of the inlet conduit 6.

For the purpose of causing the flange 21 of the closure 20 to compress the gasket 22, and also to hold the entire strainer structure in properly assembled position, a cap 25 is provided. This cap is of cup formation and comprises a cylindrical body portion 26 open at one end and closed at its opposite end by means of an integral end plate 27. The body portion 26 of the cap has lugs 28 struck inwardly therefrom and designed to coact with bayonet slots 29 formed in the outer periphery of the adjacent end of the wall which forms the conduit 6. Centrally the end plate 27 of the cap 25 is provided with a flanged and internally threaded opening 30. The threaded portion 31 of a stud, designated generally at 32, is threadedly engaged with the internally threaded, flanged opening 30. The inner end of this stud has a ball and socket connection with the closure 20. For this purpose the inner end of the stud is provided with a ball formation 33 which interfits with a correspondingly formed socket 34 provided in the central and inwardly projected portion of the closure 20. The portion of the closure 20 which forms the socket 34 is spun over the ball 33 of the stud 32, but only lightly, so that a universal movement between this ball and socket structure is provided for. The outer end of the stud 32 is formed with a tool or screw-driver slot 35 to facilitate manipulation of the stud.

With such a construction the strainer may readily be removed by backing up on the stud 32 and then disengaging the bayonet slot connection or bayonet joint 28, 29 provided between the cap 25 and the conduit 26. When this bayonet joint 28, 29 is disconnected, the cap and strainer assembly may be pulled as a unit from the conduit 6, the collar or fitting 17 slipping off of the nipple 8. After the strainer has been cleaned, it may be readily replaced, the cooperating beveled formation of the collar 17 and nipple 8 facilitating the interengagement of the inner end of the strainer assembly with the nipple 8. After the cap 25 has been connected to the conduit through its bayonet joint 28, 29, the stud 35 is tightened up to cause the flange 21 to compress the gasket 22 against its seat 11 and to lock the bayonet joint 28, 29 against accidental displacement.

With the construction described, the collar 17 and nipple 8 provide a readily releasable or slip joint, leak-proof connection or coupling between the inner end of the strainer tube and the conduit. This type of construction is advantageous in that the unitary strainer assembly may be readily manipulated to bring the elements of the coupling or joint into connected leak-proof relation and yet disassembly of these parts may be readily and easily effected. The bayonet joint constituted by the lugs 28 and slots 29 provides a readily attachable and detachable connection between the cap 25 and the conduit 6. The stud 32 functions as an adjustable connection between the cap and the closure, one which is adjustable from the exterior, and one which, due to the ball and socket joint between it and the closure, provides for uniform compression of the gasket and a consequent highly effective seal.

While we have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

We claim:

1. In combination with a conduit having a nipple at one end thereof projecting into the conduit and spaced from the adjacent portion of the inner peripheral wall thereof, the opposite end of the conduit being open and provided with a gasket seat surrounding said opening, the wall of the end of the conduit at which the gasket seat is located being provided with bayonet slots, a strainer tube of reticulated material, a mounting collar having a flanged end engaged with and secured to one end of the strainer tube, said mounting collar projecting into the strainer tube and tapering inwardly and also being provided with a coupling section at its inner end designed to have leak-proof fitting and supporting engagement with the outer periphery of said nipple, a cupped closure member having a shouldered portion interfitted and secured to the opposite end of the strainer tube and also having around its outer periphery an outwardly projecting, annular gasket engaging flange, a gasket interposed between said gasket engaging flange and said seat, a cap fitted over the end of the conduit at which the gasket seat is located and having lugs cooperable with the bayonet slots to provide a bayonet joint between the cap and the conduit, and a stud having a universal connection between its inner end and the closure and having threaded connection with the cap.

2. In combination with a conduit having a strainer supporting fitting projecting into one end and having its opposite end open, a strainer tube of reticulated material positioned in said conduit, a mounting collar secured to one end of the strainer tube, projecting into the interior thereof and adapted to have supporting and leak-proof engagement with said fitting, a closure of stepped, cupped formation having a portion extending into the opposite end of the strainer tube and secured thereto and having its large end provided with an outwardly directed, annular, gasket-engaging flange, said conduit having a gasket seat around said opening, a gasket interposed between said gasket seat and said gasket-engaging flange, a cap having means for readily attaching and detaching the same to the conduit at the open end thereof, and a stud threadedly interconnected with the cap and having a universal connection with the inner end of the cupped closure member.

3. In combination with a conduit having a strainer supporting fitting projecting into one end thereof and having its opposite end open and provided around said opening with a gasket seat, a unitary strainer assembly comprising a strainer tube of reticulated material, a mounting collar secured to one end of the strainer tube and coacting with the fitting to support its end of the strainer and to establish a leak-proof connection with the fitting, a closure member secured to the other end of the strainer tube and having a gasket-engaging flange, a gasket interposed between said flange and the gasket seat, a cap, means providing a readily attachable and releasable connection between the cap and the conduit, and a stud threadedly interconnected with the cap and having a universal connection with the closure member.

4. In combination with a conduit having a strainer supporting fitting projecting into one end thereof and having its opposite end open and provided around said opening with a gasket seat, a unitary strainer assembly comprising a strainer tube of reticulated material, a mounting collar secured to one end of the strainer tube and coacting with the fitting to support its end of the strainer and to establish a leaf-proof connection with the fitting, a closure member secured to the other end of the strainer tube and having a gasket-engaging flange, a gasket interposed between said flange and the gasket seat, a cap, means providing a readily attachable and releasable connection between the cap and the conduit, a stud having its outer end threadedly interconnected with the cap, a ball formation on the inner end of the stud, and a socket formation on the closure member with which the ball formation is universally interfitted.

5. In combination with a conduit having a nipple at one end thereof projecting into the conduit and spaced from the adjacent portion of the inner peripheral wall thereof, the opposite end of the conduit being open and provided with a gasket seat surrounding said opening, a strainer tube of reticulated material, a mounting collar having a flanged end engaged with and secured to one end of the strainer tube, said mounting collar projecting into the strainer tube and tapering inwardly and also being provided with a coupling section at its inner end designed to have leaf-proof fitting and supporting engagement with the outer periphery of said nipple, a closure for the other end of the strainer tube, said closure having a gasket-engaging flange, a gasket interposed between said gasket-engaging flange and said gasket seat, a cap for said opening of the conduit, means providing a readily attachable and detachable connection between the cap and the conduit, and an adjustable connection between the cap and the closure.

6. In combination with a conduit having an opening at one end surrounded by a gasket seat, a unitary strainer assembly comprising a strainer tube of reticulated material positionable in the conduit, a readily releasable leak-proof connection between the inner end of the strainer tube and the conduit, a closure secured to the other end of the strainer tube, said closure having a gasket-engaging flange, a gasket interposed between said flange and said gasket seat, a cap for said opening of the conduit, means providing a readily attachable and detachable connection between the cap and the conduit, and a stud threadedly interconnected with the cap and having a universal connection with the closure, said stud being adjustable from the exterior of the cap and being effective when the cap is attached to the conduit and when it is adjusted to cause the gasket-engaging flange to compress the gasket uniformly throughout.

7. In combination with a conduit having an opening at one end surrounded by a gasket seat, a unitary strainer assembly comprising a strainer tube of reticulated material positionable in the conduit, a readily releasable leak-proof connection between the inner end of the strainer tube and the conduit, a closure secured to the other end of the strainer tube, said closure having a gasket-engaging flange, a gasket interposed between said flange and said gasket seat, a cap for said opening of the conduit, means providing a readily attachable and detachable connection between the cap and the conduit, said cap having an internally threaded opening at its center, a stud having its outer end threadedly interconnected with said internally threaded opening projecting beyond the same and projecting inwardly and outwardly of the same, the outer end of the stud being adapted to be turned, a ball formation on the inner end of the stud, and a socket formation on the closure with which the ball formation is universally interfitted.

ROY W. JOHNSON.
LOURDES V. McCARTY.